Sept. 18, 1956     W. C. RUDD ET AL     2,763,756
INDUCTION WELDING
Filed Sept. 16, 1954
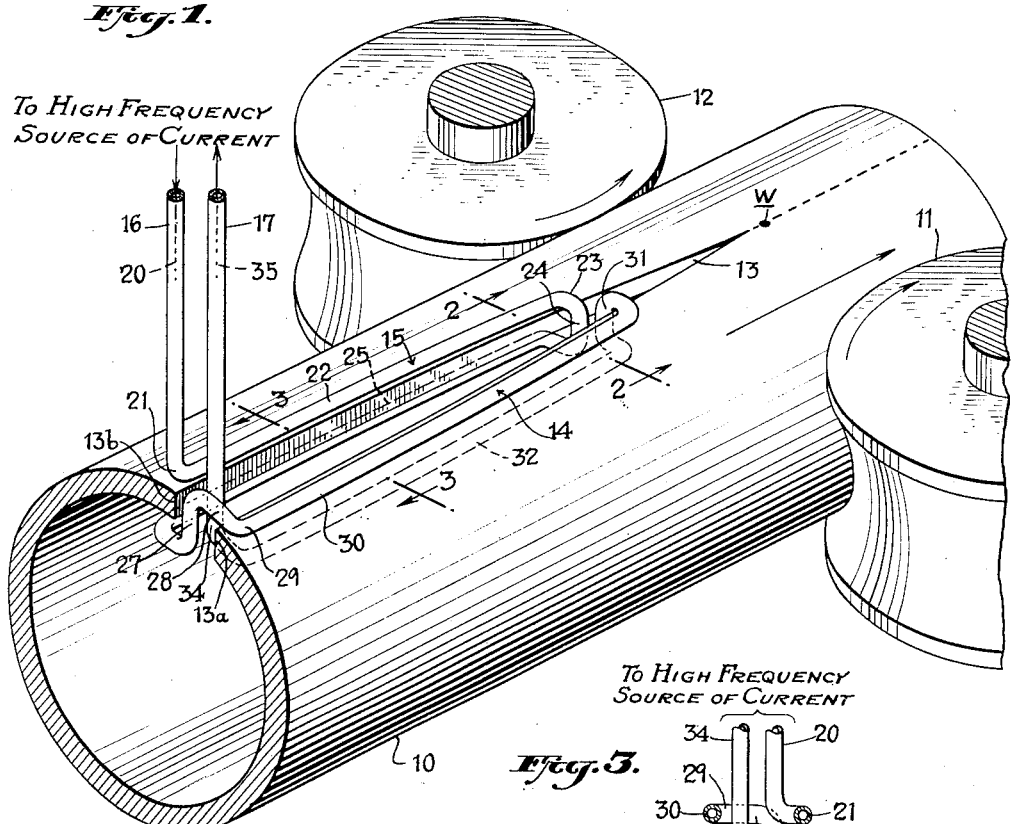
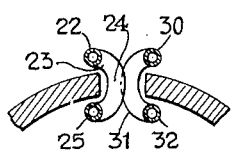
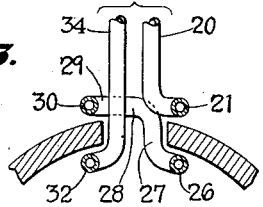
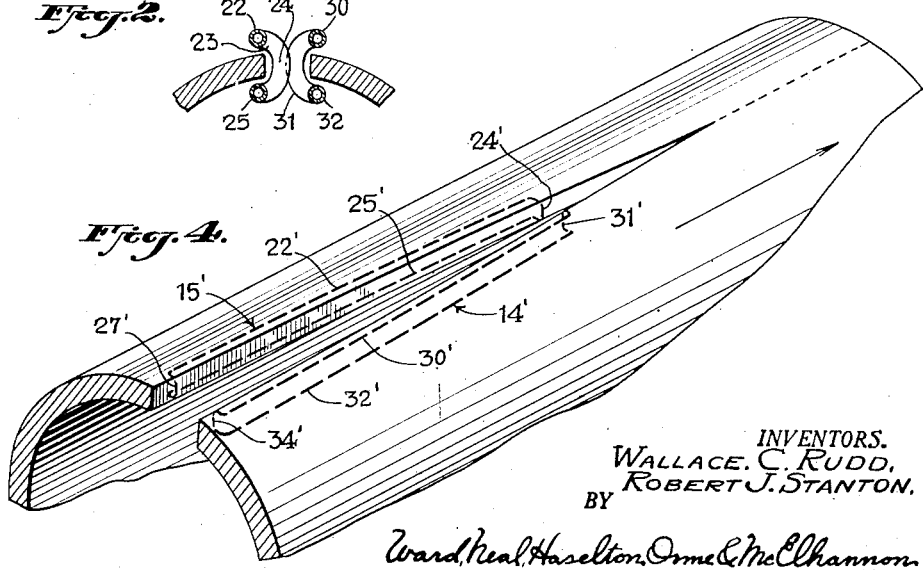
INVENTORS.
WALLACE. C. RUDD,
ROBERT J. STANTON.
BY Ward, Neal, Haselton, Orme & McElhannon
ATTORNEYS.

United States Patent Office 2,763,756
Patented Sept. 18, 1956

2,763,756

INDUCTION WELDING

Wallace C. Rudd, Larchmont, and Robert J. Stanton, Brooklyn, N. Y., assignors to Magnetic Heating Corp., New Rochelle, N. Y., a corporation of New York Application September 16, 1954, Serial No. 456,358

2 Claims. (Cl. 219—9.5)

This invention relates to methods and apparatus for welding by high frequency induction heating, and among other possible uses, the invention is particularly adapted for welding a longitudinal seam in metal tubing.

Heretofore various forms of induction heating coils and appliances have been used to heat by electro-magnetic induction the approaching opposed edges of the longitudinal gap in metal tubing, to weld together such edges as the tube passes through a tube mill. The most serious problem with such efforts has involved the inducing of a sufficient current at the surfaces of the gap edges, to economically and rapidly heat the same without the necessity of using an excessively large current generator and without waste of heating current in parts of the metal of the tubing remote from the gap edges. With various forms of induction coils which have been proposed for the purpose, one particularly serious problem of long standing has been the tendency for the current to flow circumferentially around the back of the tubing opposite from the gap thereby wasting a large proportion of the heating current instead of confining it to the gap edges. This problem is particularly serious with tubing of large sizes with which, if the heating current is not substantially confined to the gap edges where required, then large amount of metal at other portions of the tubing will have to be rapidly heated with consequent substantial waste of energy.

The present invention provides a simple form of induction heating coil so shaped and mounted with respect to the longitudinal gap in the advancing tubing in the tube mill, that high frequency current paths of low reactance will be established and concentrated along on both of the opposed gap edges, the resulting currents in and upon the metal of such edges being induced by such coil means as also will have a very low reactance, whereby a relatively small high frequency generator may be economically used to rapidly heat the gap edges and without any substantial heating of the tube metal remote from such edges. Furthermore, with this invention these desirable results are accomplished without the necessity of mounting inside the advancing tubing any special means other than the coil parts close to the gap, for preventing the flow of current circumferentially around the back portions of the tubing opposite from the gap. The invention is also applicable to the localized heating of the opposed edges and any two metal members (even though not forming portions of tubing) and which are being advanced longitudinally of the edges, as for the purpose of welding the edges together.

The method of this invention involves maintaining continuous current flows concentrated along paths respectively within and upon the metal of the two longitudinally advancing opposed edges, each of these current paths extending for example, from a point on the upper surface of the gap edge along such upper surface to a subsequent point, thence transversely down across the face of the gap edge surface to a point on the under surface adjacent the gap, thence back along such under surface to a point beneath the starting point, thence transversely up across the face of the gap edge to the starting point.

The apparatus embodying the invention in essence comprises a "double coil" or two "coils" preferably connected in series to a source of high frequency current and preferably formed of tubular conductors containing circulating cooling fluid. Each of such "coils" preferably comprises one conductor turn (although a plurality of turns might be used if preferred in some cases). Such turn or turns are of elongated shape (the elongated sides of the turns either being straight or shaped to run close to the metal edge to be heated), and each turn being, so to speak, folded over along the longitudinal axis of the turn and positioned so that the metal edge to be heated may be advanced longitudinally, along and between the resulting upper and lower sides of the turn. The conductor of each turn thus extends along in spaced relation throughout the length of its corresponding current path above-described, with one side of the turn above the metal edge to be heated and the other below.

The necessary connections to the high frequency current source and to connect the coils in series may be located at either end of the assembly or even at intermediate points, if desired. But preferably if the advancing metal edges to be heated are being brought together at a weld point, as in a tube mill, then such connections are located at the ends of the coils which are more remote from the weld point, since at this location there will be more space therefor in the gap.

Various further and more specific objects, features and advantages of the invention will appear from the description given below, taken in connection with the accompanying drawings illustrating by way of example a preferred embodiment of this invention.

In the drawings:

Fig. 1 is a perspective view somewhat schematically illustrating a preferred embodiment of the invention;

Figs. 2 and 3 respectively are sectional views taken substantially along lines 2—2 and 3—3 of Fig. 1; and Fig. 4 is a perspective view showing a longitudinal gap in a length of advancing tubing, and illustrating by heavy dash lines the path of the high-frequency currents which are established in accordance with the invention, upon and in the metal of the gap edges.

Referring to Fig. 1 in further detail, a length of tubing 10 is shown being advanced in the direction of the arrow through a tube mill, for example, and between two pressure rollers 11, 12 which cause the sides of the tubing to be pressed toward each other in order gradually to close a longitudinal gap 13 in the tubing when the gap edges reach a weld point, as indicated at w.

The approaching gap edge surfaces which are to be heated and welded together are indicated at 13a, 13b. In order inductively to heat such gap edge surfaces to welding temperature, in the example shown two single turn "coils" are used as generally indicated by the numerals 14, 15. In the usual case, these conductor turns will be in the form of metal tubing 16, 17, for example copper tubing of from about ⅛ inch to ⅜₁₆ inch in diameter, and such tubing will be connected to a suitable source of cooling fluid such as water, to prevent the coils from becoming overheated.

The coil 15 preferably comprises a conductor extending from one terminal as at 20 of the high-frequency source down to a point as at 21, closely spaced from and located just above the top corner of the gap edge surface 13b, thence extending along parallel to and just above such corner, as shown in 22, in a direction toward the weld point and for a substantial distance, for example, to a point 23. From there this conductor has a portion 24 extending down through the gap (see Fig. 2) and continuing as an elongated return portion 25 running along in closely spaced relation to the under corner of the edge surface 13b and back to a point 26 on the inside of the tube metal and close to edge surface 13b. From there the conductor extends up through the gap, as indicated at 27 (Fig. 3), thus completing the single turn of coil 15. Thence the conductor may continue as at 28 over to a point 29 adjacent the upper corner of the edge surface 13a for starting the turn of the other coil 14. As will be apparent from Figs. 1 to 3, inclusive, such other coil 14 may be like the coil 15 above-described, and has portions 30, 31 and 32 corresponding respectively with the portions 22, 24 and 25 of coil 15. The conductor portion 32 at a point beneath point 29 is shaped to extend up through the gap, as shown at 34, back to the second terminal 35 of the high-frequency source of current.

Thus, in effect, two single turn coils are provided connected in series, each coil being elongated and folded over, so to speak, about its longitudinal axis so as to provide two long conductor portions, one of which extends along beneath the corner of a gap edge surface and the other along just above the upper corner edge of the gap edge surface.

Each of these coils respectively will establish currents in and upon the metal of the gap edges, which currents flow along the paths indicated by dash lines 14', 15', approximately as shown in Fig. 4. That is, each of these coils follows a line on the metal of the tubing which runs close to and substantially parallel to the coil conductor portions, as above described, in connection with Fig. 1. Various portions of the current paths are indicated in Fig. 4 by the same numerals (except accompanied by prime marks) as are used to identify the corresponding adjacent conductor portions.

Assuming at a given instant, the current from the high frequency source as flowing into the coils through terminal 20, then the direction of current flow through conductor portion 22 will be opposite from the direction of flow through conductor portion 25 which extends along the underside of the metal close to and below portion 22. Hence since the flow is in opposite directions through these two portions and they run close together, the reactance of the coil 15 will be quite low, and as a result a heavy current may be induced in the metal along gap edge 13b and without any tendency for the induced current to stray substantially away from such edge. Similar conditions will, of course, also prevail at the other gap edge 13a. Due to the "skin" effect resulting from the use of high frequency, the current induced in the metal of the gap edges will of course have a strong tendency to flow along on and close to the surface of the metal nearest the conductor portions from which the current is induced, which accounts for the fact that the currents will flow along and closely adjacent the paths indicated by the dash lines in Fig. 4. It will be understood that the current in path 15', for example, at any given instant will be flowing in a direction opposite to the current flow at that instant in the adjacent conductor portion, also the current in path portions 22' will be flowing in a direction opposite to the current in path 25'. Similar conditions will prevail as to the other current path 14'. Thus the relationships of the two elongated conduction portions and the corresponding current path portions are such as to make for low reactance conditions and at the same time, conditions such that the current flowing in any one of the elongated path portions will not tend to repel away from the region of the gap, the current in the other most closely adjacent path portion.

Preferably, a current source is used having a frequency of the order of 300,000 or 400,000 cycles or above. For example in one trial of the above-described coils, power of about 32 kilowatts was used at a frequency of 400 kilocycles. This was found adequate to heat to welding temperature, steel edge surfaces having a wall thickness for example of about ⅛ inch, the heating being accomplished at a speed comparable to that required for advancing large steel tubing through tube mills of types now commercially available.

However, in cases where high-frequency generators of a lower frequency are already available, one may use frequencies of the order of 100 kilocycles or even frequencies well below 10,000 cycles per second.

It will be noted that as the tubing advances, as shown in Figs. 1 and 4, the heating of the gap edges will promptly start at points adjacent the left-hand ends of the coils and progressively increase till the right-hand ends of the coils are reached, at which time the edges should be brought to welding temperature, or possibly just above the temperature necessary for welding. But, following the latter point, the gap edges will carry little or no current and accordingly when the welding point w is reached there will be no tendency for electrical arcing or sputtering to cause an irregular weld.

The coil portions may be carried on any suitable insulated supporting means, not shown. Since the high-frequency current is very efficiently used, a heavy current is not required and consequently certain of the conductor portions may be brought quite close together without the occurrence of arcing therebetween, the voltage drop between same at all points being relatively low.

The invention is particularly adapted for the welding of large sizes of tubing, such for example as transcontinental pipe line tubing having a diameter of from 12 to 20 inches, as well as possibly other tubing of smaller diameters. Tubing having a heavy wall thickness may be rapidly welded since both the inside and outside surfaces at the gap may be heated equally and quickly to an incandescent plastic condition, the heat being concentrated closely along the approaching edges.

Although a preferred embodiment of the invention is herein disclosed for purposes of explanation, various modifications thereof, after study of this specification, will be apparent to those skilled in the art to which the invention pertains. Reference should accordingly be had to the appended claims in determining the scope of the invention.

What is claimed is:

1. The method for welding together two opposed edge portions of metal, which are longitudinally advancing from a spaced apart relation with an elongated V-shaped gap therebetween, into abutting relation at a weld point, and while heating the metal along the opposed edge surfaces by high-frequency electromagnetic induction; characterized in that along on each approaching edge respectively a high-frequency heating current is maintained following and closely confined to a path extending from a starting point adjacent the edge on its upper surface, along adjacent such edge for a substantial distance, then down across the edge surface to the under surface near the edge, then back along such edge on such under surface to a point thereon under the starting point, and finally up across the edge surface to the starting point, such currents on each of the two edge portions respectively being substantially confined to such paths and maintained inductively with sufficient strength to heat the edges to welding temperature by positioning conductor portions carrying high-frequency current and extending respectively along lines substantially parallel and in closely spaced relation to the current paths.

2. Apparatus for welding metal tubing along a longitudinal seam, comprising means for continuously and longitudinally advancing a length of the tubing having a longitudinal gap, means for subjecting the advancing tubing to transverse pressure to progressively close the gap at a weld point, and coil means connected to a high-frequency source of current for heating the approaching gap edges by electromagnetic induction, said coil means comprising two elongated coils each having a turn, the sides of each such turn being folded over, substantially about the longitudinal axis of the turn, one long side being mounted along, above and in spaced relation to the other long side and with the path of one of the advancing tube gap edges extending along therebetween, and the portions of the turns which connect the long sides being positioned in the path of the tube gap.

References Cited in the file of this patent

UNITED STATES PATENTS

| | | |
|---|---|---|
| 2,419,116 | Cassen et al. | Apr. 15, 1947 |
| 2,483,973 | Goettings | Oct. 4, 1949 |
| 2,528,810 | Zimmerman et al. | Nov. 7, 1950 |
| 2,582,955 | Body | Jan. 22, 1952 |